United States Patent [19]

Hay et al.

[11] 4,292,019
[45] Sep. 29, 1981

[54] EXTRUDED PLASTIC FOAM SHAPING APPARATUS

[75] Inventors: Robert A. Hay, MIdland; Oswald Bergman, Freeland, both of Mich.

[73] Assignee: The Dow Chemical Company, Midland, Mich.

[21] Appl. No.: 110,049

[22] Filed: Jan. 7, 1980

[51] Int. Cl.³ .............................................. B29D 27/00
[52] U.S. Cl. ...................................... 425/325; 264/53; 264/177 R; 425/466
[58] Field of Search ...................... 264/51, 53, 177 R; 425/325, 466, 817 C

[56] References Cited

U.S. PATENT DOCUMENTS

| | | | |
|---|---|---|---|
| 2,740,157 | 4/1956 | McCurdy et al. | 264/53 |
| 3,431,163 | 3/1969 | Gilbert | 264/53 X |
| 3,431,164 | 3/1969 | Gilbert | 264/53 X |
| 3,871,812 | 3/1975 | Phipps | 425/466 |
| 3,897,528 | 7/1975 | Suh | 264/53 X |
| 3,914,085 | 10/1975 | Kruelskie | 425/466 X |
| 3,920,876 | 11/1975 | Albert et al. | 425/466 X |
| 4,154,785 | 5/1979 | Inui et al. | 425/325 X |
| 4,201,534 | 5/1980 | Phipps | 425/466 X |

FOREIGN PATENT DOCUMENTS 1088857  9/1960  Fed. Rep. of Germany ...... 425/466

*Primary Examiner*—Philip Anderson
*Attorney, Agent, or Firm*—R. B. Ingraham

[57] ABSTRACT

Forming plates for the extrusion of foam from a slot die are provided which are adjustable in relationship to a generally adjacent die face. A movable plate portion is disposed adjacent the die face. The movable portion has a semi-cylindrical groove disposed therein. A pivoting forming plate having half-round edges has one edge disposed within the movable plate. The opposed half-round edge of the pivoting plate rests in a semi-cylindrical groove within a fixed forming plate. A similar opposed plate arrangement is employed on the opposite side of the die slot.

5 Claims, 4 Drawing Figures

EXTRUDED PLASTIC FOAM SHAPING APPARATUS

Extrusion of thermoplastic foams and the slabs, planks, boards or like generally planar objects is well known. Such extrusion is described in U.S. Pat. No. 2,740,157, the teachings of which are herewith incorporated by reference thereto. When expandable thermoplastic material is extruded from a slot die, it is generally passed between either a plurality of rolls which extend generally parallel to the major axis of the extrusion slot and/or between a pair of opposed generally planar members usually referred to as forming plates. Such forming plates generally are planar but usually are disposed on either side of an elongate extrusion slot through which the foaming material is forced. The plates diverge outwardly away from the die for a short distance and are then generally positioned parallel to each other at a distance about equal to the desired thickness of the extruded foam. Generally, the forming plates adjacent the die are relatively rigidly fixed to the die as are other supporting members, and oftentimes in order to alter their configuration, extrusion must be stopped while the die plates are altered to either provide an improved product or a different product. By a different product is meant a product having a different density or a different cell size, different cell size orientation or other physical characteristics. Various extruded foam products require varying extrusion and foaming conditions. In some instances it is desired to have the foam expand rapidly upon discharge from the die slots. In other instances it is desirable that foaming be restrained after the material leaves the die slot. In the past, alteration of the forming plate configuration has been done with difficulty, oftentimes by replacing a segment of a joined forming plate adjacent the die slot.

It would be desirable if there were available an improved apparatus for shaping extruded thermoplastic foam on extrusion.

It would also be desirable if there were an improved readily adjustable apparatus for shaping freshly extruded thermoplastic foam.

It would also be desirable if there were an improved apparatus for the shaping of freshly extruded thermoplastic foam which could be adjusted as to configuration during extrusion.

These benefits and other advantages according to the present invention are achieved in a shaping apparatus adapted to be disposed adjacent a slot extrusion die for shaping freshly extruded synthetic resinous thermoplastic foam into a generally planar configuration, the apparatus comprising a pair of generally like opposed shaping elements of generally planar configuration, the apparatus having an inlet end and a discharge end, each of the shaping elements comprising a first forming plate adapted to be disposed adjacent the die face, the first forming plate having an edge extending generally parallel to a plane containing the axis of extrusion and the major axis of a die slot, the first forming plate having an edge remotely disposed from the discharge end and generally facing the discharge end, a second forming plate having a first edge and a second edge, the second forming plate being generally parallel to the first forming plate and to edge to edge engagement therewith, a third forming plate having first and second edges and being in generally edge to edge engagement with the second forming plate and generally parallel thereto, the plates in edge to edge engagement having a convex semi-cylindrical edge in engagement with a mating concave semi-cylindrical edge, whereby when third plates or first plates of opposed shaping elements are moved closer together or moved away from each other, the second plate effectively maintains engagement with the edges of the first and third plates and moves to adjustably position the first and third plates toward or away from each other.

Further features and advantages of the present invention will become more apparent from the following specification taken in connection with the drawing wherein FIG. 1 is a schematic view depicting an isometric view of foam extrusion apparatus suitable for the preparation of generally thermoplastic elements.

Figure 1:
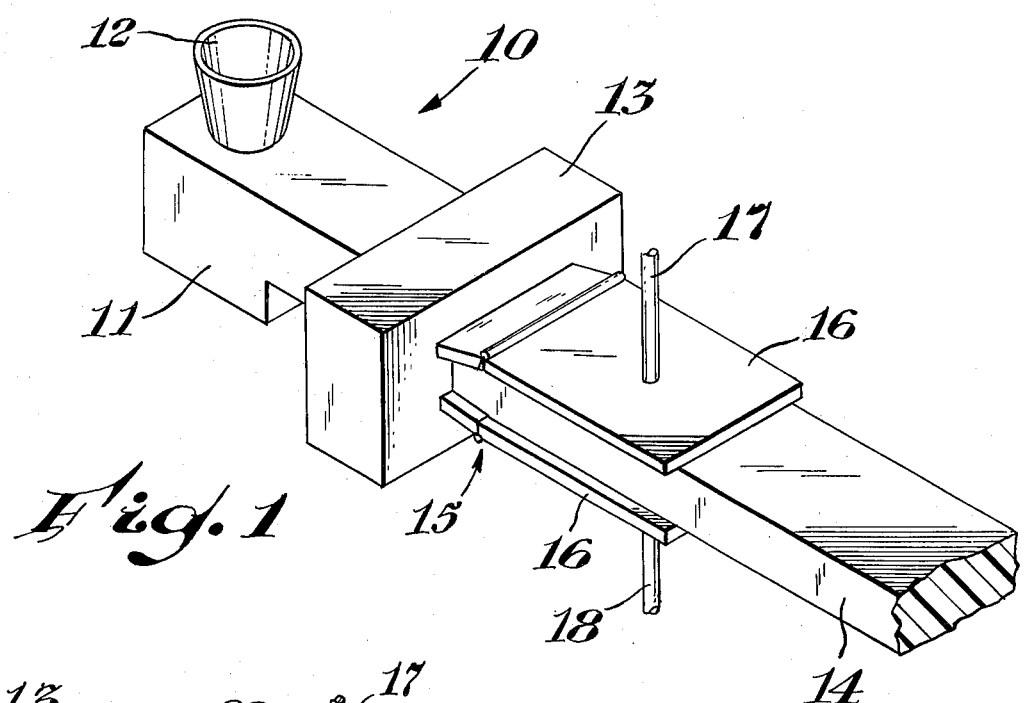

In FIG. 1, there is schematically depicted an isometric view of synthetic resinous thermoplastic foam extruding apparatus generally designated by the reference numeral 10. The foam extruding apparatus 10 comprises in cooperative combination an extruded 11, the extruder 11 having a feed source of hopper 12. Remote from the hopper 12 is extrusion die 13. The extrusion die 13 has an orifice (not shown) of a slot-like configuration from which is extruded synthetic resinous thermoplastic foam 14. A foam shaping apparatus generally designated by the reference numeral 15 is positioned immediately adjacent the die 13, the shaping apparatus 15 comprises a pair of opposed generally planar members 16 of like configuration. The member 16 are supported by frame members 17 and 18.

Figure 2:
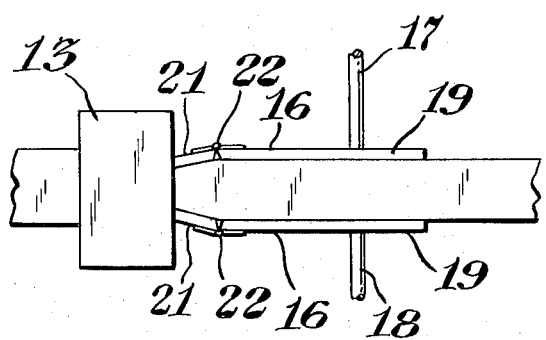
FIG. 2 is a fractional view of the die and forming plates of the apparatus of FIG. 1.

In FIG. 2 there is depicted a fractional side view of the apparatus 10 of FIG. 1 wherein the relationship of the die and the forming members 16 is shown. The forming members 16 each have two distinct regions: the parallel portions 19 disposed remote from the die and diverging portions 21 adjacent the die. The portions 21 diverge toward the portions 19 remote from the die. Beneficially, the portions 19 and 21 are pivotally joined by pivots 22 which pivot about an axis which is parallel to the die slot. Thus the parallel portions 19 may be moved closer together or further apart and the angle of the divergence of the portions 21 may be altered accordingly.

Figure 3:
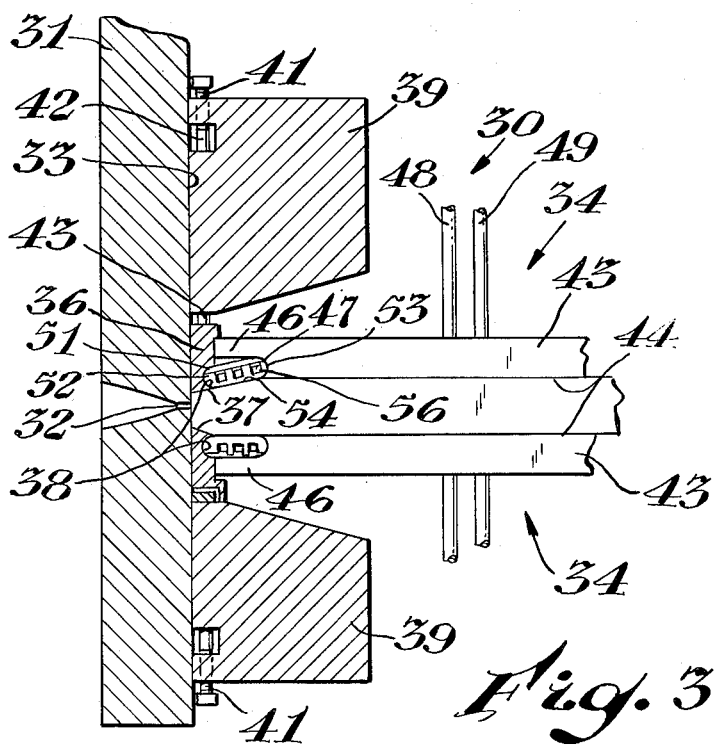
FIG. 3 is a schematic partially in-section representation of a foam forming apparatus in accordance with the present invention in association with extrusion die.

In FIG. 3 there is schematically depicted a partially in-section view of the apparatus in accordance with the invention generally designated by the reference numeral 30. The apparatus is in operative combination with an extrusion die 31 having an elongate extrusion slot 32. The die 31 has a die face 33. The shaping apparatus 30 comprises a pair of opposed generally identical shaping elements 34. The shaping elements 34 comprise a first movable forming plate 36 having a foam engaging face 37 a second pivoting forming plate, 51, and a third forming plate, 43. The movable forming plate 36 has defined therein a generally semi-cylindrical groove 38. The groove 38 extends in a direction generally parallel to the extrusion slot 32. A generally fixed frame member 39 is affixed to a convenient means, for example the die face 33. A shaft 41 passes through the frame member 39 and is maintained in fixed axial relationship thereto by means of a set collar 42. The shaft 41 has a threaded portion 41a which engages the movable forming plate 36. By rotation of the shaft 41, the movable forming plate 36 may be pushed toward or away from the opposing forming plate 36 and the die slot 32. Parallel forming plates 43 are disposed generally parallel to the forming plates 36. The parallel forming plates 43 have a foam engaging faces 44. Each forming plate 43 has a first end 46 and a second end not shown. The end 46 defines a semi-cylindrical groove 47 which extends generally parallel to the groove 38 of the movable forming plate 36. The forming plate 43 has coolant supply and discharge lines 48 and 49 respectively communicating with internal passages not shown. A pivoting forming plate 51 is positioned between forming plates 43 and 36. The pivoting forming plate 51 has elongate edges 52 and 53. The edges 52 and 53 are generally parallel to each other. The forming plate 51 has a foam engaging face 54. The forming plate 51 has heat transfer fluid ports 56 defined therein.

Figure 4:
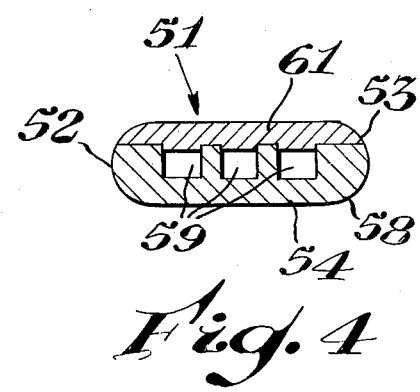
FIG. 4 is a sectional view of the rotating forming plate of FIG. 3.

In FIG. 4 there is depicted a sectional view of one of the forming plates 51 depicting the manner of its construction, wherein a first or body portion 58 having a plurality of grooves 59 milled therein with appropriate cross channels between adjacent grooves not shown and the grooves 59 sealed by a second body portion 61, and beneficially the body portions 58 and 61 being oven brazed together.

In FIG. 3 the upper forming assembly is shown with the forming face 37 disposed adjacent the die slot 32, while the lower forming assembly has the face 37 disposed remotely from the die slot 32. In a usual manner of operation, the faces 37 would be disposed symmetrically about the die slot 32.

In operation of the apparatus in accordance with the invention, it is placed in fixed relationship to the die, faces 37 parallel to the elongate die slot and the faces 37 adjusted by means of the rods 41 until the desired quality of foam is obtained. As the die plates 36 move toward or away from the die slot 32, the pivoting forming plate 51 rotates about a center generally equivalent to the center of the semi-cylindrical groove 47 in the first end 46 of the fixed forming plate 43. Due to the configuration of the grooves and the half-round edges of the pivoting forming plate 51, a generally smooth and, for practical purposes, a continuous surface is presented to the expanding foam. About 20° rotation of the rotating forming plate can be obtained without encountering undesired lodging of foam material in the pivoting joints.

In operation of the apparatus of the present invention, the foamable gel is extruded from the slot 32 of the die 31 between the first forming plate 36. The foam expands, passes the second forming plates 51 and between the third forming plates 43 where they are restrained from further expansion, at least in the thickness and direction, until the foam has cooled to a generally self-supporting condition. The forming plates 43 may be moved toward or away from each other and a generally uniform surface is presented to the foam, as the second plates 51 effectively pivot on their edges in the grooves in the adjacent edges of the first and third forming plates 36 and 43, respectively.

In a similar manner the first forming plates may be moved toward or away from the die slot 32 and present a generally continuous surface to the foam which is being extruded. Although in the drawing, the second forming plate 51 has been depicted as having convex edges, the edges of plate 51 may be concave while the corresponding edges of plates 36 and 43 may be convex, or alternatively, the plate 51 may have one convex edge and one concave edge. For machining convenience, it is believed that the embodiment depicted in FIG. 3 wherein the second forming plate 51 has convex edges is a most convenient and satisfactory arrangement.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A shaping apparatus adapted to be disposed adjacent a slot extrusion die for shaping freshly extruded synthetic resinous thermoplastic foam into a generally planar configuration, the apparatus comprising a pair of generally like opposed shaping elements of generally planar configuration, the apparatus having an inlet end and a discharge end, each of the shaping elements comprising a first forming plate adapted to be disposed adjacent the die face, the first forming plate having an edge extending generally parallel to a plane containing the axis of extrusion and the major axis of a die slot the first forming plate having an edge remotely disposed from the discharge end and generally facing the discharge end, a second forming plate having a first edge and a second edge, the second forming plate being generally parallel to the first forming plate and to edge to edge engagement therewith, a third forming plate having first and second edges and being in generally edge to edge engagement with the second forming plate and generally parallel thereto, the plates in edge to edge engagement having a convex semi-cylindrical edge in engagement with a mating concave semi-cylindrical edge, whereby when third plates or first plates of opposed shaping elements are moved closer together or moved away from each other, the second plate effectively maintains engagement with the edges of the first and third plates and moves to adjustably position the first and third plates towards or away from each other.

2. The apparatus of claim 1 wherein the edges of the second forming plates are convex and edges of adjacent first and third forming plates are concave.

3. The apparatus of claim 2 wherein at least the second forming plate has defined therein a heat exchange fluid passageway.

4. The apparatus of claim 1 in combination with a slot extrusion die.

5. The apparatus of claim 4 in operative combination with an extruder, the extruder being affixed to the extrusion die and adapted to supply a foamable gel thereto.

* * * * *